June 28, 1932. H. E. WOERNLE 1,864,878
HANDLE STRUCTURE
Filed Jan. 28, 1930
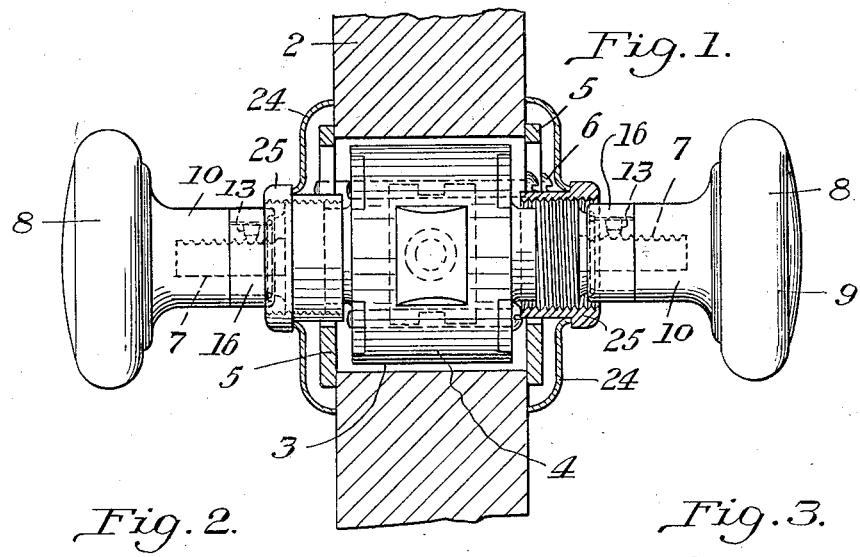
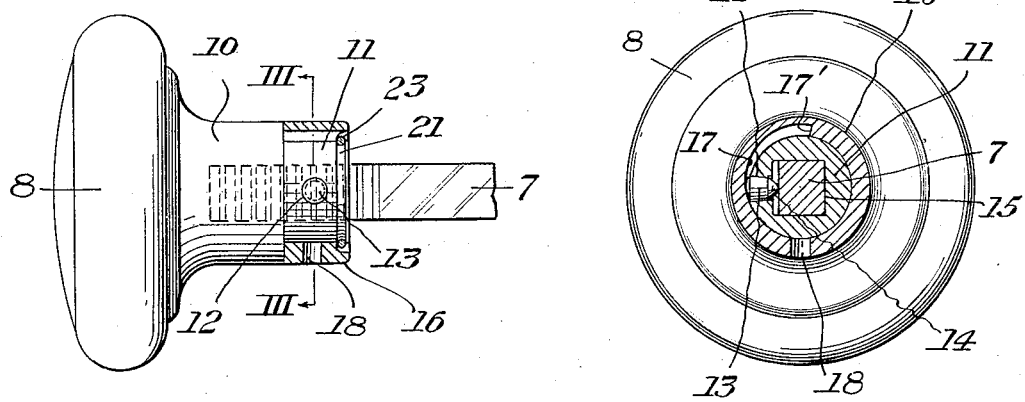
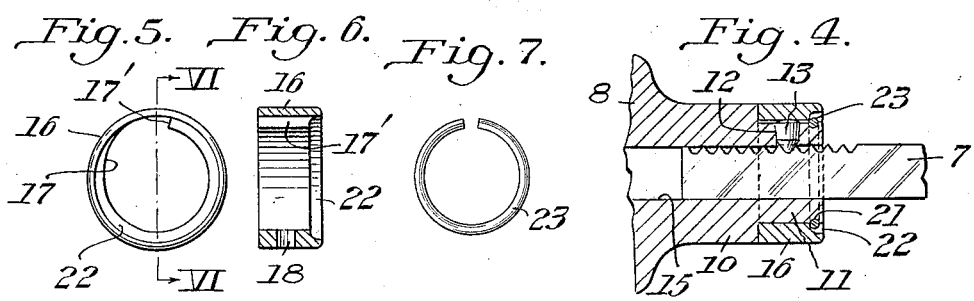
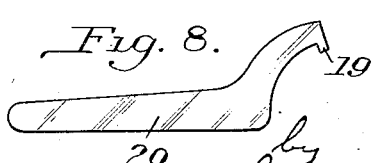
INVENTOR
Harry E. Woernle Patented June 28, 1932

1,864,878

UNITED STATES PATENT OFFICE

HARRY E. WOERNLE, OF PITTSBURGH, PENNSYLVANIA, ASSIGNOR TO McKINNEY MANUFACTURING COMPANY, OF PITTSBURGH, PENNSYLVANIA, A CORPORATION OF PENNSYLVANIA

HANDLE STRUCTURE

Application filed January 28, 1930. Serial No. 423,958.

This invention relates broadly to handle structures, and more particularly to means for attaching door handles to their spindles. It relates still more particularly to what is termed a "screwless handle", that is, one which can be attached to its spindle without the use of a set screw.

The invention further relates to a handle structure comprising means connected with the handle and adapted to engage the spindle whereby to connect the handle rigidly to the spindle while leaving the exterior of the handle free from any screw or bolt heads.

Heretofore the most common method of attaching a door handle to its spindle has comprised the provision of a set screw passing through the shank of the handle and engaging the spindle. Such screws, however, have the disadvantages that they appear at the exterior of the shank, thus presenting an unsightly appearance, that they become loosened and unscrewed, permitting the handle to be accidentally disengaged from the spindle, and that they require considerable time and care to apply.

It has also been proposed to screw a door handle directly onto a threaded spindle, thereby eliminating the use of set screws, but in such cases the handles become very easily unscrewed. In some instances set screws have also been used with handles threaded directly onto their spindles to prevent unscrewing of the handles, but this provision has the disadvantages of presenting an unsightly appearance and adding to the cost and the work necessary for installation.

Such methods of attaching handles to their spindles require in most instances the use of a screw driver and necessitate the expenditure of considerable time to properly assemble the structure.

I provide a handle structure obviating the various disadvantages above noted. Such structure may be adapted for connection with a spindle without the use of a screw driver, without threading the handle proper onto the spindle, and without requiring the application of a set screw and the presenting of an unsightly screw head outwardly of the shank of the handle. The structure is adapted for quick assembly and is practically foolproof. There is little or no danger that the handle may become accidentally disengaged from the spindle, and the external appearance of the handle and shank is smooth and attractive.

I provide a handle structure comprising a shank having a spindle receiving recess, slidable means movable transversely of the shank for engaging a spindle within the recess, and means for holding such slidable means inwardly in engagement with the spindle.

I further provide a handle structure comprising a shank having a spindle receiving recess, a spindle retaining collar on the shank, the shank and collar having radially recessed portions, and a retaining ring entering such portions for holding the shank and collar in assembled relationship.

The handle structure provided in accordance with the present invention is of generally simplified and improved form. Other objects and advantages of the invention will become apparent as the following description of a present preferred embodiment thereof proceeds.

The invention is equally applicable to various kinds of handle structures, such as knobs and lever handles. In the accompanying drawing I have shown a present preferred embodiment of the invention as applied to a knob structure, wherein Figure 1 is an elevational view, partly in cross-section, of a door having a latch structure applied thereto;

Figure 2 is an enlarged detail view, partly in cross-section, showing a means for connecting a knob to a spindle;

Figure 3 is a cross-section taken on the line III—III of Figure 2;

Figure 4 is an enlarged cross-sectional view through the knob attaching mechanism;

Figure 5 is a plan view of one of the attaching members;

Figure 6 is a cross-section taken on the line VI—VI of Figure 5;

Figure 7 is a plan view of a retaining member; and

Figure 8 is a plan view of a wrench adapted for use in engaging and disengaging the knob structure with the spindle.

Referring more particularly to the drawing, reference numeral 2 designates a door to which is applied a latch structure designated generally by reference numeral 3. The latch structure comprises a latch unit 4 contained within a bore in the door 2 and positioned therein by plates 5 connected by screws 6. Certain features of this construction are described and claimed in my copending application, Serial No. 399,528, filed October 14, 1929. The latch structure may be of the general type disclosed in the patent to Wread, No. 1,720,636. Inasmuch as the specific latch structure forms no part of the present invention it will not be described.

Connected with the latch structure and extending outwardly therefrom on opposite sides of the door are spindles 7, to which handles in the form of knobs 8 are connected by means presently to be described. Each knob 8 comprises a handle or gripping portion 9 and a shank 10. The shank 10 has a substantially axial spindle receiving recess and is provided with a reduced extremity 11 through which extends a transverse opening 12. Slidably mounted within the opening 12 is a stud 13 having a generally tapered extremity 14 adapted to engage the spindle 7 and to enter a suitable depression formed therein. The spindle receiving recess 15 of the knob shank is preferably of a cross-section to correspond with that of the spindle so that the knob is thus prevented from turning relative to the spindle.

The stud 13 lies loosely within the opening 12 in the knob shank extremity 11, the stud and opening being slightly tapered to positively prevent the stud from passing completely through the inner extremity of the opening, the stud being adapted at its inner end to engage the spindle. Adapted to surround the extremity of the shank and hold the stud 13 in engagement with the spindle is a retaining collar 16 having in its inner periphery a tapered cam face 17. The major portion of the inner periphery of the collar 16 is circular and adapted to lie in contact with the outer surface of the extremity 11 of the knob shank 10. However, the inner periphery of the collar through a relatively minor portion thereof is tapered to form the cam face 17 above mentioned. This cam face has one extremity at a substantially greater distance from the center of the collar than the other extremity, the former terminating at a substantially radial surface 17′ on the inside of the collar and the latter merging into the substantially circular portion of the inner periphery of the collar. The portion of the cam face 17 farthest removed from the center of the collar is at a sufficient distance from the outer surface of the shank extremity 11 to permit the collar to be slipped axially over such extremity, the stud 13 passing freely within such portion of the cam face. The inner end face of the collar is adapted to abut the shoulder formed on the knob shank between the main shank portion 10 and the reduced extremity 11, the outer surface of the collar being adapted to form in effect a continuation of the outer surface of the body of the shank 10, thus presenting a smooth exterior of pleasing appearance.

In order to securely hold the knob structure in place on the spindle, the collar 16 is rotated in the clockwise direction, viewing Figure 3, whereby the tapered cam face 17 tightens against the outer extremity of the stud 13, forcing the stud positively toward the spindle and into engagement therewith, as shown in such figure. Inasmuch as the inner extremity 14 of the stud engages within a depression in the spindle and is firmly held therein by the collar 16, the knob assembly is thus securely and permanently connected to the spindle. The frictional resistance between the tapered cam face 17 of the collar and the outer extremity of the stud is sufficient to tightly hold the collar in place and hence to insure against accidental separation of the knob structure and spindle. In order to provide for easily and positively turning the collar 16, it has a radial socket 18 adapted to receive the lug 19 of a capstan wrench 20 of suitable size. By means of this wrench the collar may be tightened or loosened as desired.

I provide means for maintaining the collar in place on the knob shank regardless of whether or not the knob structure is applied to a spindle. The outer face of the extremity 11 of the knob shank 10 is recessed adjacent its end, as shown at 21, and the inner face of the outer extremity of the collar 16 is correspondingly recessed, as shown at 22. After the collar has been slipped over the shank extremity 11, a split retaining ring 23 is sprung about the portion 21 of such extremity so as to engage the same and the inner periphery of the outer extremity of the collar, whereby to positively prevent axial movement of the collar with respect to the shank, while at the same time permitting rotative movement thereof. This furnishes a very simple yet highly effective provision for insuring against accidental separation of the knob shank and collar while providing for relative rotative movement thereof.

The knob structure is preferably assembled independently of the spindle and the assembled knob structure is merely slipped over the extremity of the spindle and positioned as desired thereon, whereupon the collar 16 is turned to tighten the stud 13 against the spindle. Although the wrench socket 18 and the wrench 20 are provided for tightening the collar, the mechanical advantage afforded by the cam face 17 is so great that it is entirely possible to tighten the collar by hand without the use of the wrench. In order to insure a permanent connection, however, it is desirable to tighten the collar somewhat more firmly than can be done by hand.

Although the spindle is shown as having a uniform series of depressions in one of its faces, any equivalent means is fully as satisfactory. The spindle may be screw-threaded about its periphery, as is common practice. Although some depression in the spindle is desirable, it is possible to attach the knob structure to a plain spindle having merely flat faces with no depressions. This can be done because the point of the stud will be caused to form for itself a slight depression in the surface of the spindle due to the great pressure exerted thereon by the collar through the mechanical advantage obtained by reason of the inclined cam face 17.

Cover plates 24 are provided over the spindles on opposite sides of the door, and these cover plates are held in place by screws 25 threaded onto the latch structure, as is well known.

Thus I provide a handle structure which not only eliminates the use of set screws with their attendant disadvantages in appearance and effectiveness, but also enables the attachment of the structure to a spindle in a very small fraction of the time required to attach either a handle screwed onto its spindle or a handle requiring a set screw. As a matter of fact, the handle assembly of the present invention may easily be applied to a spindle in from one to three seconds, inasmuch as it is merely necessary to place the assembled handle structure over the end of the spindle and then turn the collar 16 through a few degrees, either with the wrench or by hand. The handle structure is highly practical because of the firmness with which it grips the spindle, the mechanical advantage obtained in the action of the cam face 17 having this effect. Furthermore, the collar is very effectively maintained in place on the shank of the handle whether or not the handle structure is attached to a spindle, therefore avoiding the necessity of doing any assembling of the structure at the time it is applied to the door. The handle structures are made up and sold as complete assembled units, and there is no necessity for taking them apart at any time, either prior to or in the process of applying them to a latch structure. The external appearance and configuration of the handle structure is unbroken by any set screw heads and thus presents an unusually clearcut and pleasing appearance. The socket 18 is preferably positioned at the bottom of the handle structure as it is applied to a door so that it will not be visible, but even if positioned at the top it is not unsightly and does not detract from the appearance of the assembly.

While I have shown and described a present preferred embodiment of the invention, it is to be distinctly understood that the same is not limited thereto, but may be otherwise variously embodied within the scope of the following claim:

I claim:

A composite article of manufacture, comprising a door knob having a spindle receiving opening, a rotatable collar adapted to substantially surround a spindle when the latter is inserted into the spindle receiving opening in the knob, such collar having an internal cam face, and a stud cooperating with said internal cam face of the rotatable collar to assist in fastening the spindle and knob together, such collar and stud being attached to the knob so as to form therewith a commercial unit capable of being handled and fastened to and unfastened from a spindle without disassembly of the unit.

In testimony whereof I have hereunto set my hand.

HARRY E. WOERNLE.